(12) United States Patent
Xu

(10) Patent No.: US 10,477,219 B2
(45) Date of Patent: Nov. 12, 2019

(54) IMAGE-PROCESSING APPARATUS AND LOSSLESS IMAGE COMPRESSION METHOD USING INTRA-FRAME PREDICTION

(71) Applicant: Silicon Motion, Inc., Jhubei, Hsinchu County (TW)

(72) Inventor: Yang Xu, Banta Town (CN)

(73) Assignee: SILICON MOTION, INC., Jhubei, Hsinchu County (TW)

(*) Notice: Subject to any disclaimer, the term of this patent is extended or adjusted under 35 U.S.C. 154(b) by 35 days.

(21) Appl. No.: 15/854,037

(22) Filed: Dec. 26, 2017

(65) Prior Publication Data

US 2019/0149827 A1    May 16, 2019

(30) Foreign Application Priority Data

Nov. 13, 2017 (CN) .......................... 2017 1 1116103

(51) Int. Cl.
*H04N 19/159* (2014.01)
*H04N 19/186* (2014.01)
*H04N 19/93* (2014.01)

(52) U.S. Cl.
CPC ......... *H04N 19/159* (2014.11); *H04N 19/186* (2014.11); *H04N 19/93* (2014.11)

(58) Field of Classification Search
CPC .... H04N 19/103; H04N 19/174; H04N 19/59; H04N 19/124; H04N 19/13; H04N 19/159; H04N 19/186; H04N 19/93; H04N 19/16; H04N 19/18; H04N 19/88; H04N 19/44
See application file for complete search history.

(56) References Cited

U.S. PATENT DOCUMENTS

| | | | | |
|---|---|---|---|---|
| 7,469,069 B2* | 12/2008 | Kim | ..................... | H04N 19/105 |
| | | | | 375/E7.133 |
| 7,535,961 B2* | 5/2009 | Cho | ..................... | H04N 19/105 |
| | | | | 375/240.12 |
| 2002/0097802 A1* | 7/2002 | Lin | ..................... | H04N 19/197 |
| | | | | 375/240.23 |
| 2003/0039396 A1* | 2/2003 | Irvine | ................. | H04N 19/119 |
| | | | | 382/233 |
| 2006/0103556 A1* | 5/2006 | Malvar | ................... | H03M 7/40 |
| | | | | 341/63 |
| 2006/0210176 A1* | 9/2006 | Kajiwara | ............. | H04N 19/105 |
| | | | | 382/232 |
| 2006/0262982 A1* | 11/2006 | Matsumoto | .......... | H04N 19/593 |
| | | | | 382/238 |

(Continued)

*Primary Examiner* — Dramos Kalapodas
(74) *Attorney, Agent, or Firm* — McClure, Qualey & Rodack, LLP

(57) ABSTRACT

A lossless image compression method using intra-frame prediction is provided. The method includes the steps of: receiving an input image; performing intra-frame prediction on sub-pixels in each color channel of each pixel in the input image to generate first prediction residues; performing inter-color-channel prediction on the first prediction residues to generate second prediction residues; performing remapping on the second prediction residues to obtain third prediction residues in each color channel; and performing Golomb coding and run-length coding on the third prediction residues to generate an image bitstream of the input image.

8 Claims, 3 Drawing Sheets

(56) References Cited

U.S. PATENT DOCUMENTS

| | | | |
|---|---|---|---|
| 2008/0144124 A1* | 6/2008 | Samadani | H04N 1/32128 |
| | | | 358/453 |
| 2015/0016501 A1 | 1/2015 | Guo et al. | |
| 2015/0201201 A1* | 7/2015 | Cheong | H04N 19/186 |
| | | | 382/166 |
| 2016/0113480 A1* | 4/2016 | Homan | H04N 19/117 |
| | | | 348/65 |
| 2016/0295243 A1* | 10/2016 | Ashrafi | H04N 19/18 |
| 2016/0313582 A1* | 10/2016 | Takano | G02F 1/1339 |
| 2017/0070753 A1* | 3/2017 | Kaneko | H04N 19/61 |
| 2018/0213258 A1* | 7/2018 | Xu | H04N 19/60 |
| 2019/0068994 A1* | 2/2019 | He | H04N 19/13 |
| 2019/0124342 A1* | 4/2019 | Young | H04N 19/124 |

\* cited by examiner

IMAGE-PROCESSING APPARATUS AND LOSSLESS IMAGE COMPRESSION METHOD USING INTRA-FRAME PREDICTION

CROSS REFERENCE TO RELATED APPLICATIONS

This Application claims priority of China Patent Application No. 201711116103.4, filed on Nov. 13, 2017, the entirety of which is incorporated by reference herein.

BACKGROUND OF THE INVENTION

Field of the Invention

The invention relates to image processing, and, in particular, to an image-processing apparatus and a lossless image compression method using intra-frame prediction.

Description of the Related Art

JPEG-LS is an algorithm for performing lossless compression on static continuous-tone images in the new ISO/ITU standard. The JPEG-LS algorithm has the advantages of low complexity and a high recovery rate, and is widely used in the fields of digital cameras, network transmission, wireless communications, and medical imaging.

Lossless compression indicates that the recovered image after compression is identical to the original image without any loss. If there is any difference between the recovered image and the original image, and the difference is limited to being within a predetermined range, this kind of image compression technique is regarded as lossy compression. Although the recovered image has some loss using lossy compression, the loss cause minor effects to the visual image, and thus the lossy compression technique can be regarded as lossless. There are many existing lossless or lossy image compression algorithms such as the traditional lossless JPEG algorithm, FELICS, CALIC, etc.

However, in the JPEG-LS image compression standard, conventional intra-frame prediction generally encodes each of the luminance and chrominance components separately. Conventional intra-frame prediction techniques may ignore correlations between the color channels (e.g. red, blue, and green color channels), resulting in a longer length (i.e., more bits) of the image bitstream and a lower image compression ratio.

Accordingly, there is demand for an image-processing apparatus and a lossless image compression method using intra-frame prediction to solve the aforementioned problem.

BRIEF SUMMARY OF THE INVENTION

A detailed description is given in the following embodiments with reference to the accompanying drawings.

In an exemplary embodiment, an image-processing apparatus is provided. The apparatus includes a memory unit and a processing unit. The memory unit is configured to store an input image of the image-processing apparatus. The processing unit is configured to perform intra-frame prediction on a red sub-pixel, a green sub-pixel, and a blue sub-pixel of each pixel in the input image to generate a first red prediction residue, a first green prediction residue, and a first blue prediction residue, respectively. The processing unit further performs inter-color-channel prediction on the first red prediction residue, the first green prediction residue, and the first blue prediction residue to generate a second red prediction residue, a second green prediction residue, and a second blue prediction residue, respectively. The processing unit further performs remapping on the second red prediction residue, the second green prediction residue, and the second blue prediction residue to obtain a third red prediction residue, a third green prediction residue, and a third blue prediction residue, respectively. The processing unit further performs Golomb coding and run-length coding on the third red prediction residue, the third green prediction residue, and the third blue prediction residue to generate an image bitstream of the input image.

In another exemplary embodiment, a lossless image compression method using intra-frame prediction is provided. The method includes the steps of: receiving an input image; performing intra-frame prediction on a red sub-pixel, a green sub-pixel, and a blue sub-pixel of each pixel in the input image to generate a first red prediction residue, a first green prediction residue, and a first blue prediction residue, respectively; performing inter-color-channel prediction on the first red prediction residue, the first green prediction residue, and the first blue prediction residue to generate a second red prediction residue, a second green prediction residue, and a second blue prediction residue, respectively; performing remapping on the second red prediction residue, the second green prediction residue, and the second blue prediction residue to obtain a third red prediction residue, a third green prediction residue, and a third blue prediction residue, respectively; and performing Golomb coding and run-length coding on the third red prediction residue, the third green prediction residue, and the third blue prediction residue to generate an image bitstream of the input image.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
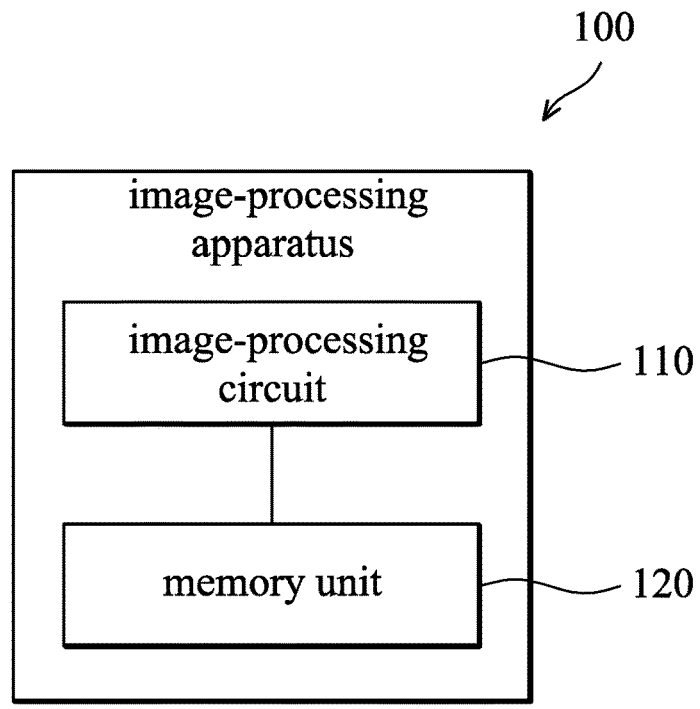
FIG. 1 is a block diagram of an image-processing apparatus in accordance with an embodiment of the invention.

FIG. 1 is a block diagram of an image-processing apparatus in accordance with an embodiment of the invention. The image-processing apparatus 100, for example, may be an image encoding apparatus. In an embodiment, the image-processing apparatus 100 includes an image-processing circuit 110 and a memory unit 120. The image-processing circuit 110 may perform image encoding on an input image to generate an image bitstream, wherein the image encoding may include intra-frame prediction, inter-color-channel prediction, Golomb encoding, and run-length coding.

In some embodiments, the image-processing circuit 110 may be an application-specific integrated circuit (ASIC), a field-programmable gate array (FPGA), or any other equivalent logic circuits, but the invention is not limited thereto.

In some alternative embodiments, the image-processing circuit 110 may be a central processing unit (CPU), a digital signal processor (DSP), or an image signal processor (ISP), but the invention is not limited thereto. In the embodiment, the image-processing circuit may execute an image encoding program to perform image encoding on the input image.

The memory unit 120 may be a dynamic random access memory (DRAM) or a static random access memory (SRAM) that is used as an image buffer while the image-processing circuit 110 is performing image encoding.

Figure 2:
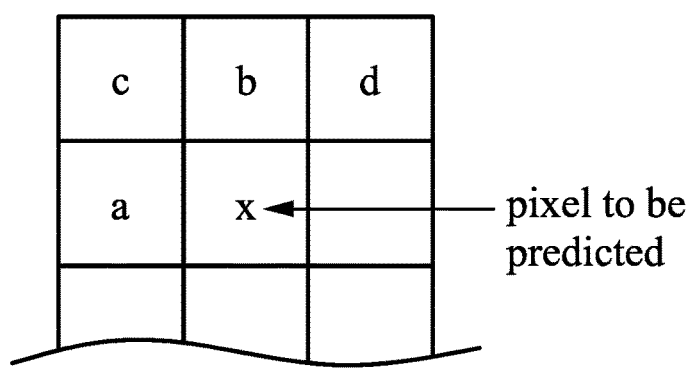
FIG. 2 is a diagram of intra-frame prediction in accordance with an embodiment of the invention.

FIG. 2 is a diagram of intra-frame prediction in accordance with an embodiment of the invention.

As illustrated in FIG. 2, pixel x denotes the pixel to be encoded, and pixels a, b, c, and d are neighboring pixels of pixel x. Since the pixels are processed in a raster scan order during intra-frame prediction, only the left and upper neighboring pixels of pixel x are available for intra-frame prediction.

For example, given that Px denotes the prediction value of pixel x, Px can be predicted using various methods, such as:

$$Px=a; \quad (1)$$

$$Px=b; \quad (2)$$

$$Px=c; \quad (3)$$

$$\text{when } c>a \text{ and } c>b, Px=\min(a,b); \text{ when } c<a \text{ and } c<b, Px=\max(a,b); \quad (4)$$

The residue Err of the intra-frame prediction equals the current pixel x minus the prediction value Px. That is, Err=x−Px.

It should be noted that, the aforementioned intra-frame prediction performs prediction on each pixel in each color channel separately. That is, for the current pixel x of the input image, the prediction value of the red sub-pixel is predicted using its left and upper neighboring red sub-pixels, and the prediction value of the green sub-pixel is predicted using its left and upper neighboring green sub-pixels, and the prediction value of the blue sub-pixel are predicted using its left and upper neighboring blue sub-pixels. In other words, the red sub-pixel, green sub-pixel, and blue sub-pixel of the current pixel x has a red prediction value, a green prediction value, and a blue prediction value, respectively. After performing a corresponding subtraction process on each of the red, green, and blue prediction values, a first red prediction residue Er, a first green prediction residue Eg, and a first blue prediction residue Eb are obtained, respectively.

In an embodiment, the image-processing circuit 110 may perform an inter-color-channel prediction on the first red prediction residue Er of the red channel and the first green prediction residue Eg of the green channel with reference to the first blue prediction residue Eb of the blue channel, thereby obtaining a second red prediction value Er' and a second green prediction residue Eg'.

In some embodiments, the image-processing circuit 110 may perform the inter-color-channel prediction on the remaining two color channels with reference to the first green prediction residue Eg of the green channel or the first red prediction residue Er of the red channel.

Collectively, the image-processing circuit 110 may perform an inter-color-channel prediction on the first red prediction residue, the first green prediction residue, and the blue prediction residue of each pixel in the input image to generate a second red prediction residue, a second green prediction residue, and a second blue prediction residue, respectively. That is, for the color channel being the reference color channel, its second prediction residue is equal to the first prediction residue.

It should be noted that the second red prediction residue, the second green prediction residue, and the second blue prediction residue generated by the inter-color-channel prediction performed by the image-processing circuit 110 are further reduced in comparison with the first red prediction residue, the first green prediction residue, and the first blue prediction residue. Specifically, when the overall prediction value is less, the information entropy is less. Thus, the overall bits required for image encoding are less, resulting in higher encoding efficiency and a shorter length of the image bitstream.

Figure 3A:
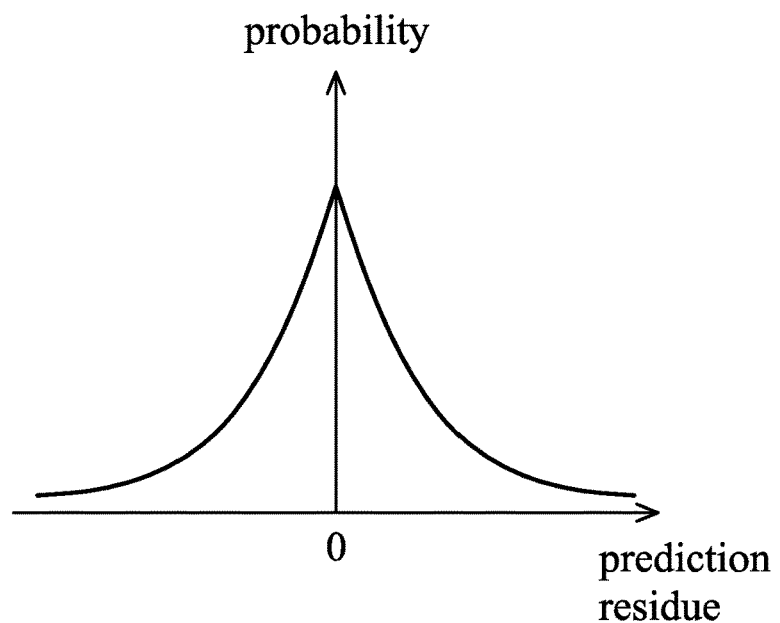
FIG. 3A is a diagram of the original distribution of the second prediction residues in accordance with an embodiment of the invention.
Figure 3B:
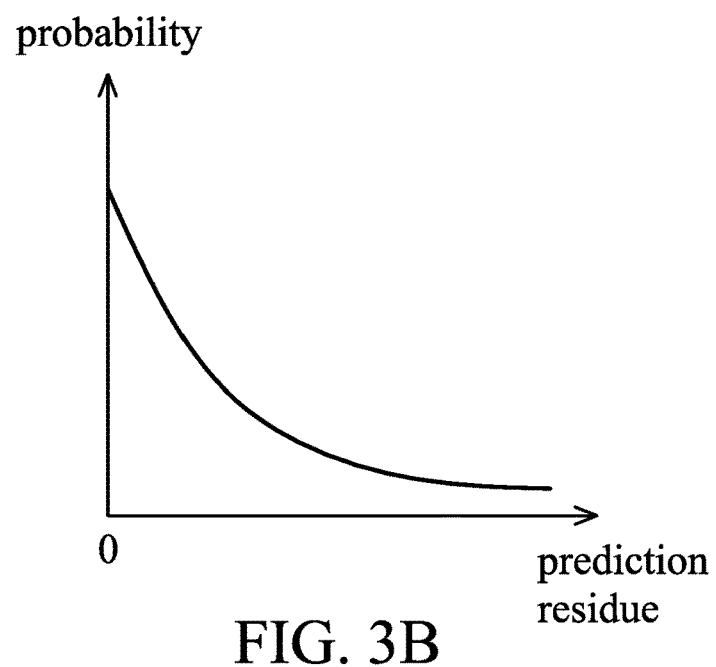
FIG. 3B is a diagram of the distribution of the remapped second prediction residues in accordance with an embodiment of the invention.

FIG. 3A is a diagram of the original distribution of the second prediction residues in accordance with an embodiment of the invention. FIG. 3B is a diagram of the distribution of the remapped second prediction residues in accordance with an embodiment of the invention.

The image-processing circuit 110 further performs remapping on the second red prediction residues, the second green prediction residues, and the second blue prediction residues. For example, in a common condition, the probability distribution of the second prediction residues may follow the Laplace distribution, as shown in FIG. 3A. Specifically, the Laplace distribution is centered at zero, and is exponentially attenuated toward the positive and negative direction. If the brightness value of a pixel is represented by an 8-bit value, the maximum of the 8-bit value is MAXVAL=255, and the dynamic range RANGE is equal to MAXVAL+1=256. That is, the second prediction residues are sampled between the range from −MAXVAL to MAXVAL, that can be expressed as: −MAXVAL<=E<=MAXVAL, where E=x−Px. Since the sampling range exceeds the capability of an 8-bit value, the remapping mechanism is performed on the second prediction residues, such that the remapped second prediction residues is between the range [0, RANGE−1], where RANGE=2*MAXVAL. The second prediction residues (i.e., including the second red prediction residues, the second green prediction residues, and the second blue prediction residues) are remapped to third prediction residues (i.e., including the third red prediction residues, the third green prediction residues, and the third blue prediction residues), and the distribution of the third prediction residues is similar to the geometric distribution, as shown in FIG. 3B. For the third prediction residues having a geometric distribution, the Golomb coding method may have the best encoding efficiency.

In the embodiment, the image-processing circuit 110 performs the Golomb coding and run-length coding respectively on the third red prediction residues, the third green prediction residues, and the third blue prediction residues to generate the image bitstream of the input image.

With regard to Golomb coding, given that x denotes the integer to be encoded, when the value of x is smaller, the length of the output bitstream after performing Golomb coding is shorter. In the present application, the algorithm of the Golomb coding can be expressed as the following equations:

$$b=2^m \quad (5)$$

$$q=\text{INT}((x-1)/b) \quad (6)$$

$$r = x - q*b - 1 \quad (7)$$

Accordingly, the integer x can be encoded into two portions. The first portion includes q 1's and one zero. The second portion is an m-bit binary number having a value r.

In addition, there are usually flat regions (i.e. regions having low brightness variances) in the input image, and the neighboring prediction residues of these flat regions may be the same.

The image-processing circuit 110 may detect the third red prediction residue, the third green prediction residue, and the third blue prediction residue of each pixel in the input image. When it is detected that the prediction residues of neighboring pixels (i.e., in the raster scan order) in each color channel are the same, the image-processing circuit 110 may perform the run-length coding. In the run-length coding, the image-processing circuit 110 may detect whether the current prediction residue is equal to the next prediction residue. If the aforementioned condition is satisfied, the image-processing circuit 110 may keep detecting the subsequent prediction residues, and record the number of successive prediction residues having the same value (i.e., the number of successive pixels have the same prediction residues in each color channel), where the recorded number is the run length. The image-processing circuit 110 may encode the run length and the prediction residues in color channel to generate the image bitstream of the input image.

In an embodiment, the image-processing apparatus 100 may be paired with a corresponding image decoder (not shown), and the image decoding procedure of the image decoder is contrary to the image encoding procedure of the image-processing apparatus. One having ordinary skill in the art will appreciate the details of the corresponding image decoder according to the image encoding procedure of the image-processing apparatus 100 of the present invention, and thus the details for the image decoder will be omitted here.

Figure 4:
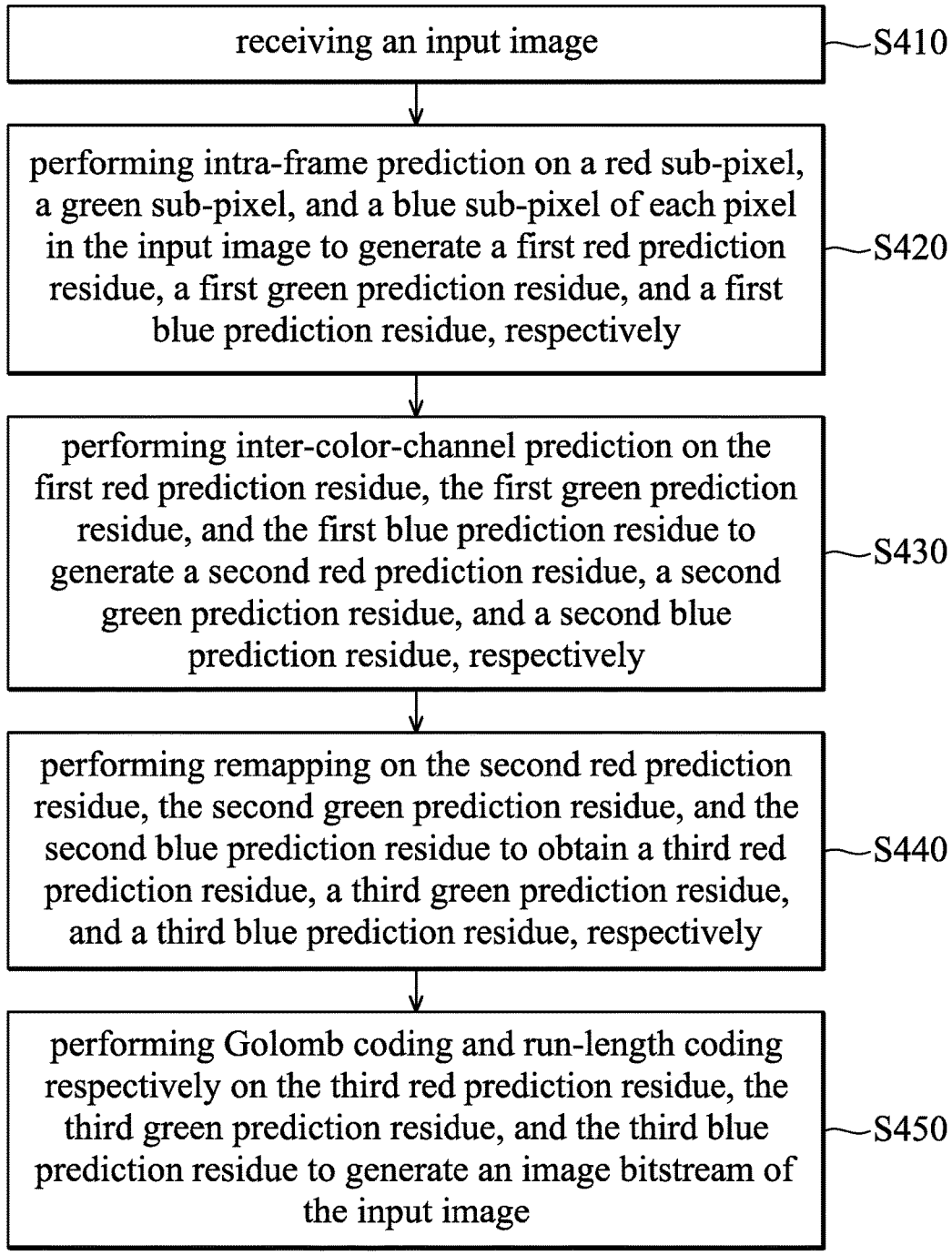
FIG. 4 is a flow chart of a lossless image compression method using intra-frame prediction in accordance with an embodiment of the invention.

FIG. 4 is a flow chart of a lossless image compression method using intra-frame prediction in accordance with an embodiment of the invention.

In step S410, an input image is received by the image-processing circuit 110. For example, the input image may be an RGB image.

In step S420, the image-processing circuit 110 performs intra-frame prediction on the red sub-pixel, green sub-pixel, and blue sub-pixel of each pixel in the input image to generate a first red prediction residue, a first green prediction residue, and a first blue prediction residue, respectively. For example, the image-processing circuit 110 may perform the intra-frame prediction method in the embodiment of FIG. 2 to predict the residue of the red sub-pixel, green sub-pixel, and blue sub-pixel of each pixel in the input image, and then subtract the first red prediction residue, the first green prediction residue, and the first blue prediction residue from the red pixel, the green pixel, and blue pixel to obtain the first red prediction residue, the first green prediction residue, and the first blue prediction residue, respectively.

In step S430, the image-processing circuit 110 performs an inter-color-channel prediction on the first red prediction residue, the first green prediction residue, and the first blue prediction residue of each pixel in the input image to generate a second red prediction residue, a second green prediction residue, and a second blue prediction residue, respectively. For example, the image-processing circuit 110 may use one of the red, green, or blue color channels as a reference color channel, and perform the inter-color-channel prediction on the other two color channels.

In step S440, the image-processing circuit 110 performs remapping on the second red prediction residue, the second green prediction residue, and the second blue prediction residue to obtain a third red prediction residue, a third green prediction residue, and a third blue prediction residue, respectively. For example, the range of the prediction residues is remapped to the geometric distribution from the Laplace distribution, so that the overall number of bits for encoding the input image is reduced.

In step S450, the image-processing circuit 110 performs Golomb coding and run-length coding respectively on the third red prediction residue, the third green prediction residue, and the third blue prediction residue to generate an image bitstream of the input image. For example, the Golomb coding is used to encode the prediction residues of the geometric distribution for the best encoding efficiency, thereby obtaining the least number of bits required for encoding the input image. The run-length coding may further encode the flat regions (i.e., neighboring pixels have equal prediction residues) of the input image to further reduce the number of bits required for encoding the input image. In some embodiments, step S440 can be omitted, and it indicates that the image-processing circuit 110 may perform the Golomb coding and run-length coding respectively on the second red prediction residue, the second green prediction residue, and the second blue prediction residue to obtain the image bitstream of the input image.

In view of the above, an image-processing apparatus and a lossless image compression method using intra-frame prediction are provided. The image-processing apparatus and the lossless image compress method are capable of performing intra-frame prediction and inter-color-channel prediction for different color channels, and considering the correlation between different color channels in the color image, such that the overall prediction residues become smaller. Accordingly, the total number of bits for encoding the image becomes smaller, thereby improving the image encoding efficiency.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image-processing apparatus, comprising:
   a memory unit, configured to store an input image of the image-processing apparatus; and
   a processing unit, configured to perform intra-frame prediction on a red sub-pixel, a green sub-pixel, and a blue sub-pixel of each pixel in the input image to generate a first red prediction residue, a first green prediction residue, and a first blue prediction residue, respectively,
   wherein the processing unit further performs inter-color-channel prediction on the first red prediction residue, the first green prediction residue, and the first blue prediction residue to generate a second red prediction residue, a second green prediction residue, and a second blue prediction residue, respectively,
   wherein the processing unit further performs remapping on the second red prediction residue, the second green prediction residue, and the second blue prediction residue having a Laplace distribution to obtain a third red prediction residue, a third green prediction residue, and a third blue prediction residue having a geometric distribution, respectively, wherein the processing unit further perform Golomb coding and run-length coding on the third red prediction residue, the third green prediction residue, and the third blue prediction residue to generate an image bitstream of the input image.

2. The image-processing apparatus as claimed in claim 1, wherein the processing unit predicts a red prediction value, a green prediction value, and a blue prediction value of the red sub-pixel, the green sub-pixel, and the blue sub-pixel of each pixel in the input image, and the processing unit subtracts the red prediction value, the green prediction value, and the blue prediction value from the red sub-pixel, the green sub-pixel, and the blue sub-pixel to obtain the first red prediction residue, the first green prediction residue, and the first blue prediction residue, respectively.

3. The image-processing apparatus as claimed in claim 1, wherein the inter-color-channel prediction indicates that the processing unit determines the first blue prediction residue as the reference value, and subtracts the first blue prediction residue from the first red prediction residue and the first green prediction residue to obtain the second red prediction residue and the second green prediction residue, and the second blue prediction residue is equal to the first blue prediction residue.

4. The image-processing apparatus as claimed in claim 1, wherein the processing unit detects a number of successive pixels that respectively have the same third red prediction residue, the third green prediction residue, and the third blue prediction residue, and encodes the number of successive pixels and the third red prediction residue, the third green prediction residue, and the third blue prediction residue to obtain the image bitstream.

5. A lossless image compression method using intra-frame prediction, comprising:

receiving an input image;

performing intra-frame prediction on a red sub-pixel, a green sub-pixel, and a blue sub-pixel of each pixel in the input image to generate a first red prediction residue, a first green prediction residue, and a first blue prediction residue, respectively;

performing inter-color-channel prediction on the first red prediction residue, the first green prediction residue, and the first blue prediction residue to generate a second red prediction residue, a second green prediction residue, and a second blue prediction residue, respectively;

performing remapping on the second red prediction residue, the second green prediction residue, and the second blue prediction residue having a Laplace distribution to obtain a third red prediction residue, a third green prediction residue, and a third blue prediction residue having a geometric distribution, respectively; and performing Golomb coding and run-length coding on the third red prediction residue, the third green prediction residue, and the third blue prediction residue to generate an image bitstream of the input image.

6. The method as claimed in claim 5, further comprising:

predicting a red prediction value, a green prediction value, and a blue prediction value of the red sub-pixel, the green sub-pixel, and the blue sub-pixel of each pixel in the input image; and subtracting the red prediction value, the green prediction value, and the blue prediction value from the red sub-pixel, the green sub-pixel, and the blue sub-pixel to obtain the first red prediction residue, the first green prediction residue, and the first blue prediction residue, respectively.

7. The method as claimed in claim 5, further comprising:

determining the first blue prediction residue as the reference value; and subtracting the first blue prediction residue from the first red prediction residue and the first green prediction residue to obtain the second red prediction residue and the second green prediction residue, and the second blue prediction residue is equal to the first blue prediction residue.

8. The method as claimed in claim 5, further comprising:

detecting a number of successive pixels that respectively have the same third red prediction residue, the third green prediction residue, and the third blue prediction residue; and encoding the number of successive pixels and the third red prediction residue, the third green prediction residue, and the third blue prediction residue to obtain the image bitstream.

* * * * *